United States Patent
Sourdeau

Patent Number: 6,139,056
Date of Patent: *Oct. 31, 2000

[54] MECHANICAL JACK FOR AUTOMOTIVE VEHICLES

[76] Inventor: Alejandro Martin-Lunas Sourdeau, Profesor Waskman, 5, 28036 Madrid, Spain

[*] Notice: This patent issued on a continued prosecution application filed under 37 CFR 1.53(d), and is subject to the twenty year patent term provisions of 35 U.S.C. 154(a)(2).

[21] Appl. No.: 09/428,204

[22] Filed: Oct. 27, 1999

[30] Foreign Application Priority Data

Oct. 27, 1998 [ES] Spain ................................ 9802253

[51] Int. Cl.⁷ ............................................. B60S 9/02
[52] U.S. Cl. ........................... 280/763.1; 280/766.1; 254/424
[58] Field of Search .................... 280/766.1, 763.1; 254/424

[56] References Cited

U.S. PATENT DOCUMENTS

| | | | |
|---|---|---|---|
| 3,306,629 | 2/1967 | Oerman et al. | 280/475 |
| 3,475,008 | 10/1969 | Taylor | 254/86 |
| 3,568,979 | 3/1971 | Notenboom | 254/116 |
| 3,726,543 | 4/1973 | Dalton | 280/150.5 |
| 3,823,958 | 7/1974 | Trejbal | 280/150.5 |
| 3,989,276 | 11/1976 | Hamerl | 280/763 |
| 4,055,329 | 10/1977 | Hammond | 254/86 |
| 4,084,830 | 4/1978 | Daniel, Jr. et al. | 280/6.1 |
| 4,784,400 | 11/1988 | Hoflus | 280/6.1 |
| 4,955,450 | 9/1990 | Deinlein-Kalb et al. | 180/199 |
| 5,348,300 | 9/1994 | Few et al. | 280/475 |
| 5,401,046 | 3/1995 | Schwartz et al. | 280/425.1 |
| 5,509,687 | 4/1996 | Thorndike | 280/766.1 |
| 5,755,430 | 5/1998 | Couch | 254/420 |

*Primary Examiner*—Christopher P. Ellis
*Assistant Examiner*—Rashmi Sharma
*Attorney, Agent, or Firm*—Ostrolenk, Faber, Gerb & Soffen, LLP

[57] ABSTRACT

A vehicle chassis has lateral sides with a groove for a respective jack in each side. A jack in a groove in the chassis of a vehicle includes nuts which receive a horizontal, rotatable shaft which move the nuts selectively together or apart. A runner is movable to the ground or up to close the groove. Cross pieces are pivoted between the nuts and the runner so that the cross pieces selectively move the runner up or down.

8 Claims, 2 Drawing Sheets

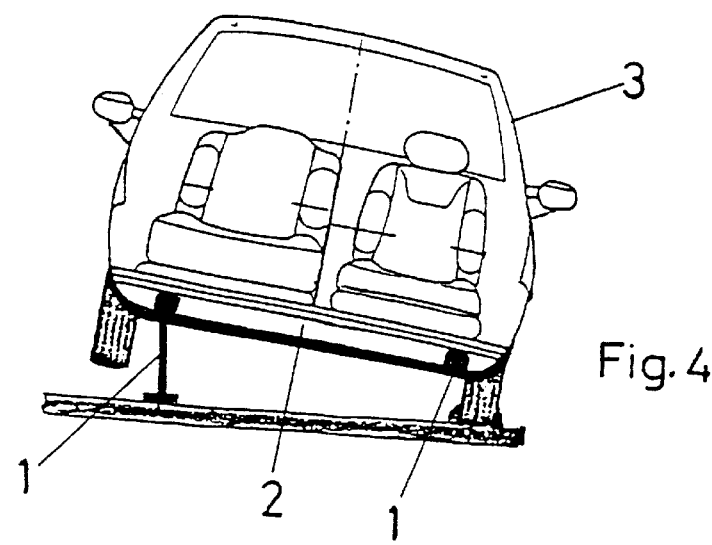
Fig. 4
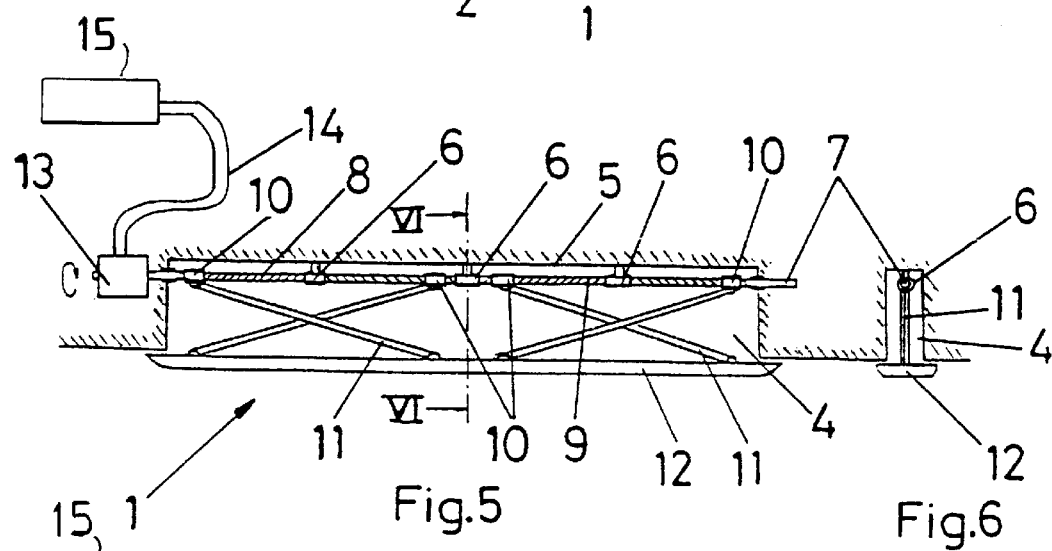 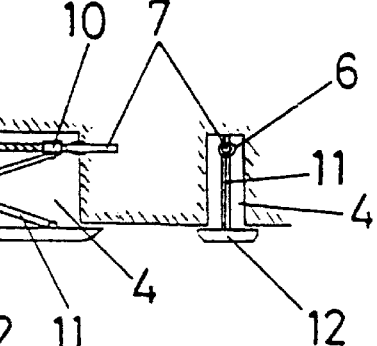
Fig. 5    Fig. 6
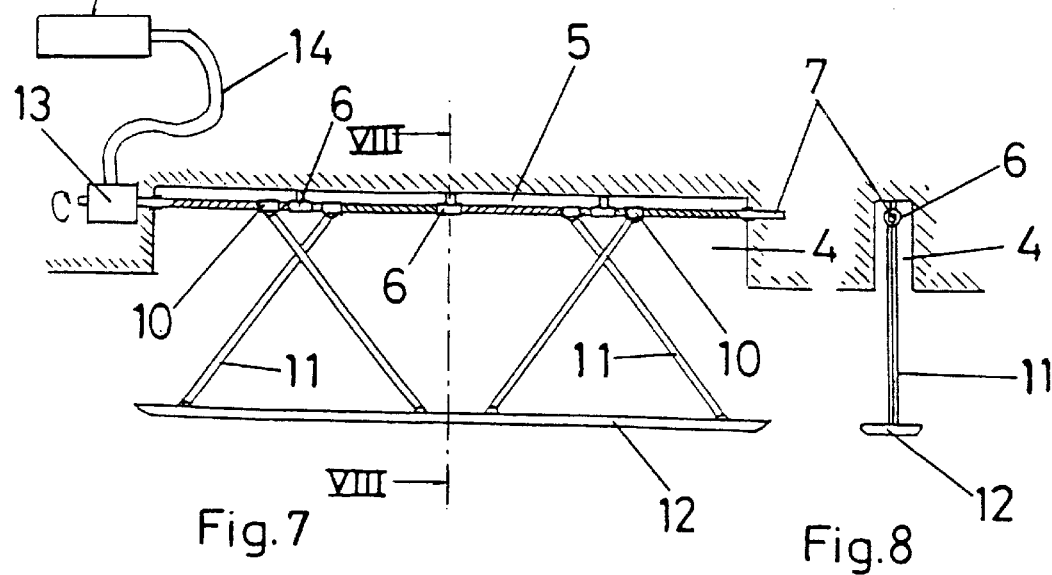 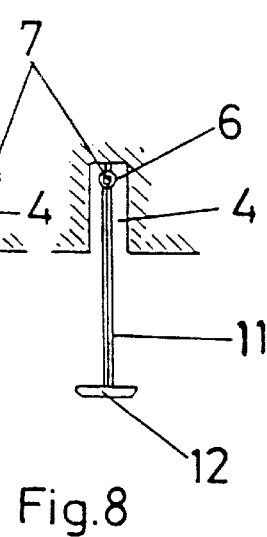
Fig. 7    Fig. 8

MECHANICAL JACK FOR AUTOMOTIVE VEHICLES

BACKGROUND OF THE INVENTION

The present invention refers to a mechanical jack for automotive vehicles.

The novelty of the jack of the invention resides in its construction and the manner of placing it within the resistant structure or chassis of the vehicle.

Jacks and other mechanical devices are known for raising automobiles, mainly when changing one of the wheels. It is also known that changing a wheel is very unpleasant because it is a laborious, dirty task complicated at times by the tightness of the screws on the wheel to be changed.

SUMMARY OF THE INVENTION

The foregoing problems that are generally found with the use and type of jacks of this sort are resolved by the jack of the invention, where the user does not need to position it or remove it because it is appropriately placed in the vehicle chassis.

In particular, the jack of the invention is preferably incorporated into the two longest lateral beams of the chassis, preferably at their center along their length, to allow each wheel on each side to be changed. With the jack of the invention incorporated into the resistant structure of the vehicle, the above described problems of a traditional jack are avoided. The problem is that every time a wheel must be raised, it must be placed in the support provided for this purpose on the vehicle.

The jack of the invention is preferably located in a groove of a lateral beam in the chassis. It includes a shaft in the groove that is activated and rotated by the output shaft of a small electric motor that is fed by current from the vehicle battery. The motor is activated by a switch placed inside the vehicle.

On the lower support side outside the groove in the chassis, the jack has the shape of a runner. The jack includes cross pieces with an end held on and movable by a screw threaded connection between each cross piece and the rotating shaft while also being held stationary along the lower support side. Rotating the shaft in one direction moves the cross pieces so that the jack becomes taller, and rotating the shaft in the other direction moves the cross pieces so that the jack becomes shorter the runner moves up toward closing the groove.

In order to more easily understand the formation and the actual use of the jack of the invention, reference is made below to a practical example shown in the attached drawings.

Other features and advantages of the present invention will become apparent from the following description of the invention which refers to the accompanying drawings.

BRIEF DESCRIPTION OF THE DRAWINGS

FIGS. 3 and 4 show the two positions of the vehicle with one or the other of the lateral jacks activated, respectively.

FIG. 5 shows a side view of the jack of the invention set into the structure of the vehicle and in each one of the two largest lateral pieces.

FIG. 6 shows a sectional view of FIG. 5 along the line VI—VI.

FIG. 7 shows a view similar to FIG. 5 with the jack in the raised working position.

FIG. 8 shows a sectional view of FIG. 7 along the line VIII—VIII.

DETAILED DESCRIPTION OF AN EMBODIMENT OF THE INVENTION

Figure 1:
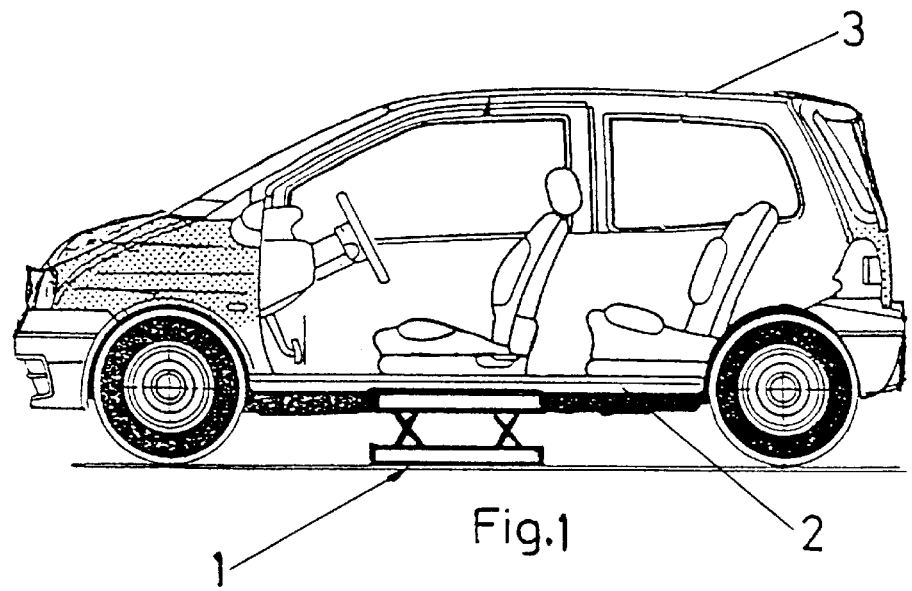
FIG. 1 shows a lateral view of an automotive vehicle with a jack of the invention mounted to it.
Figure 2:
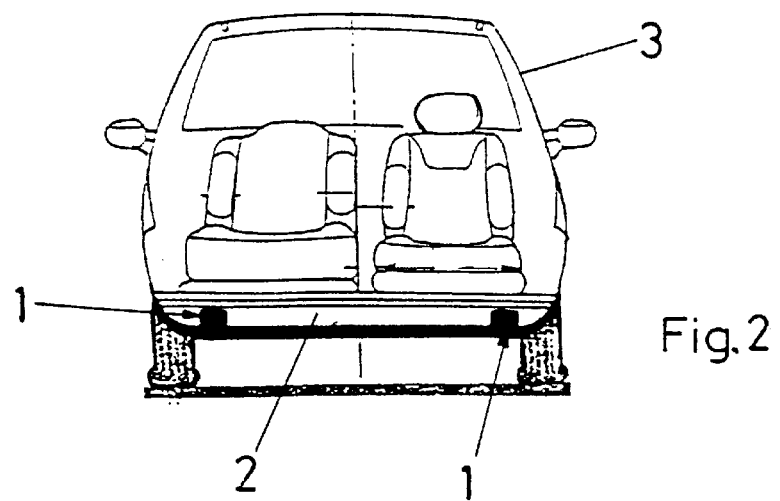
FIG. 2 shows an end view of the vehicle with the jack of the invention mounted on the two larger lateral or side beams of the chassis.
Figure 3:
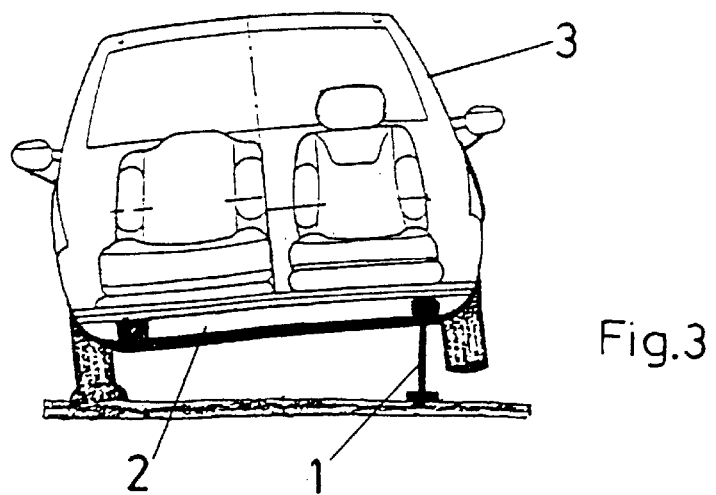

A jack 1 of the invention is mounted on a chassis 2 of an automotive vehicle 3 and is particularly located along in the central zone of each of the longitudinal sides or beams of the vehicle chassis, as shown in FIGS. 2–4.

The jack 1 is placed in a groove 4 in the underside of the side beam of the chassis. Tubular supports 6 are attached in the bottom 5 of the groove. The tubular supports 6 extend horizontally. The tubular supports 6 have an internal thread which form nuts in which a shaft 7 is mounted horizontally and which permit the shaft to be rotated in the tubular supports while being retained in the groove by those supports.

The shaft has two axially neighboring, preferably oppositely threaded parts 8 and 9 that extend off in opposite directions.

The shaft moves sets comprised of two other nuts 10 horizontally and those nuts are moved along the shaft 7 by its rotation. The two nuts 10 of a set form parts of the two cooperating cross pieces 1 which are attached at their free ends to the outward runner 12. The cross pieces 11 are articulated to the nuts 10 and to the runner 12 to pivot between the retracted storage and operative positions respectively shown in FIGS. 5 and 7. The two nuts 10 define a set of nuts and the the shaft parts 8 and 9 are threaded so that the nuts move toward or away from each other, with motion of the nuts in one direction moving the runner toward the ground and motion in the opposite direction moving the runner toward closing the groove.

The screw shaft 7 is connected to the driven shaft of the motor 13. The motor receives current from the vehicle battery 15. The motor is activated by a switch 14.

When the jack is in the non-operational position in FIG. 5, the runner 12 covers the mechanism including the groove in which it is mounted.

Having sufficiently described the nature of the invention and the manner of putting it into practice, it should be noted that the above layouts indicated and shown in the attached drawings may be modified in detail provided the fundamental principle is not altered.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mechanical jack for use in combination with an automotive vehicle, wherein the vehicle has a chassis with lateral sides, the lateral sides of the chassis each having a which opens downwardly toward the ground for receiving the jack, the jack comprising:

a plurality of nuts received in the grooves of the chassis, oriented for receiving a threaded shaft therein;

the threaded shaft cooperatingly threaded to the thread of the nuts and extending through the nuts, wherein the nuts and the shaft are threaded such that the nuts move together or apart selectively as the shaft is rotated in a first direction or in an opposite second direction;

a runner below the groove for being selectively moved to an operative position into contact with the ground to raise the chassis and into an inoperative position out of contact with the ground;

a respective cross piece connected between each of the nuts in the groove and the runner, such that upon rotation of the shaft in the nuts, the nuts are moved along the shaft with respect to the runner to change the orientation of the cross pieces for moving the runner out of the groove as the shaft rotates in the first direction and for moving the runner toward the groove as the shaft rotates in the second direction; and means for rotating the shaft selectively in the first and the second directions;

wherein the jack resides substantially entirely within the groove when in the inoperative position.

2. The jack of claim 1, further comprising a support in the groove for retaining the shaft in the groove and permitting the shaft to be rotated in the groove.

3. The jack of claim 2, wherein the support in the groove comprises a tubular support through which the shaft extends and in which the shaft rotates.

4. The jack of claim 1, comprising a set of first and second ones of the nuts on the shaft, and the first and second nuts of the set are so threaded and the shaft is so threaded that the nuts of the set move toward each other as the shaft rotates in the first direction and move away from each other as the shaft rotates in the second direction.

5. The jack of claim 4, wherein the shaft has a first and a second section which are oppositely threaded, and the first and the second nuts of the set are respectively on the first and second sections of the shaft.

6. The jack of claim 1, wherein the means for rotating the shaft comprises an electric motor connected with the shaft for rotating the shaft.

7. The jack of claim 6, wherein the motor is connected to a vehicle battery and a switch connected with the motor for activating the motor.

8. The jack of claim 1, wherein the runner is shaped to cover and close the groove as a lid, and the cross pieces and the runner are operable to close the groove as the shaft is rotated in the second direction.

* * * * *